United States Patent Office 3,209,420
Patented Oct. 5, 1965

3,209,420
MOLD AND CORE BINDER FOR FOUNDRY USE
William J. King, Edina, and John J. Uppgren, St. Paul, Minn., assignors to Archer-Daniels-Midland Company, Minneapolis, Minn., a corporation of Delaware
No Drawing. Filed July 5, 1963, Ser. No. 293,140
13 Claims. (Cl. 22—193)

This invention relates to mold and core binder for foundry use and, more particularly, to improvements in alkali metal silicate containing mold or core-forming compositions which are adapted to be cured or hardened by impregnation with carbon dioxide or other gaseous curing agents and preferably given a short baking cycle, to molds or cores formed therefrom, to methods for their preparation and use and products thereof.

In recent years there has been considerable interest in the preparation of molds and cores from sand-siliciate mixtures which are cured or hardened in the desired casting-defining shapes by exposure to carbon dioxide or other gaseous curing materials. Generally, the curing of molds embodying binders of this type involves a chemical reaction between carbon dioxide or other gaseous material and the alkali metal silicate dispersed throughout the sand or other refractory material substantially completely to convert the alkali metal silicate into uniformly-dispersed silica gel and an alkali metal carbonate. The advantages of such molds are many. Not only are aging and post-curing treatments eliminated thus permitting rapid fabrication of molds or cores without requiring the use of expensive equipment, but also close tolerance castings are obtained. Moreover, the process is relatively simple and can be carried out readily on a large scale.

However, despite these advantages, certain difficulties have been encountered with prior silicate-containing core-forming compositions of this type at casting temperatures generally, and especially in the casting of high temperature melting metals such as cast iron and steels. At casting temperatures previous silicate-containing compositions have been characterized by lack of collapsibility, or by excessive evolution of steam and/or other gases during casting if sufficient organic additives were present to provide satisfactory collapsibility. Also such formulations, as known, tend to have deleterious effects on shear or tensile strength if a post cure baking cycle is contemplated.

With silicate binders shear strength increases with a longer gassing time. However when subsequently baked, the longer gassing time produces a weaker bond. It is therefore necessary either to sacrifice on shear strength in order to form the strongest baked bond or to sacrifice on baked strength in order to utilize the good shear properties. The shear strength produced on gassing is a compressive strength, and while it is adequate to remove a core from the core mold it is seldom adequate to give sufficient tensile strength to sustain rough handling and assembly during the casting operation.

When a silicate binder is gassed and subsequently baked the tensile strength is generally adequate at a binder level of 2 to 4%. However, as the examples illustrate at high temperatures such as those experienced in casting molten metal, the silicate binder increases in strength due to the formation of ceramic or glasseous structures. This factor greatly limits the usefulness of silicate binders which otherwise would be highly desirable. The silicate binders thus have limited uses. When silicate binders are used for the internal fabrication of a casting, the core is often times very difficult to remove, especially where intricate designs are incorporated.

The present invention comprises an improvement over prior art by eliminating the undesirable aspects of silicate binders while retaining the desirable features, especially in respect to improvements in the collapsibility or so called "fired strength" of alkali metal silicate-containing mold or core-forming composition.

Accordingly, it is a principal object of the present invention to provide a new and improved alkali metal silicate-containing binder composition which provides high gassed strength, good tensile strength on baking, and in addition provides high collapsibility after casting.

A further object of the invention is to provide new and improved compositions for forming alkali metal silicate-containing binders adapted to be cured by exposure to carbon dioxide or other substances.

A further object of this invention is to provide an alkali metal silicate-containing composition having improved gassed shear strength.

A further object is to provide an alkali metal silicate-containing composition which, when given a short baked cure after gassing, results in increased tensile strength and improved collapsibility.

A still further object of the invention is to provide new and improved methods of metal casting.

The objects of this invention are accomplished by the method of forming a metal casting mold which comprises placing in contact with a casting defining surface an intimate mixture of a major proportion of a finely divided refractory material, from about 1% to about 6% by weight of said refractory of an alkali metal silicate, an amount of a furan modified urea-formaldehyde resin sufficient to provide mold collapsibility after casting without deleterious effect on other properties but not greater than about 400% by weight of the silicate binder, and impregnating the mixture with an acidic gaseous reactant capable of curing the mixture.

The silicate binder composition of the present invention produces similar gassed strength at equal binder levels with a substantial reduction in silicate content. On baking, the tensile strength is not greatly affected by the gassing time as is a straight silicate binder. The collapsibility after casting is greatly improved making it possible to utilize a silicate binder composition where previously silicates could not be used.

As used throughout the specification and claims the terms "mold" and "core" are intended in a generic sense to mean casting forms which include both molds and cores, this invention in no manner being limited to either. Moreover, "mold" is intended to include various patterns for use in the casting art, as well as shell molds including shell mold-forming elements in addition to a completed shell mold structure prepared by assembling two or more complementary thin-walled shell mold elements. Hence, it will be appreciated that the term "mold" is used to include a casting-defining surface broadly.

The present invention contemplates as a mold-forming composition a mixture of a major preparation of a finely-divided refractory material, a minor proportion of an alkali metal silicate, and a minor proportion of a furan binder. Other so called collapsibility agents such as sugars, pitches or polyhydric alcohols may or may not be present.

The provision of the furan binder provides an improvement in collapsibility of a fired mold whereby the mold forming material is more readily removable from the metal casting surface than heretofore has been the case with silicate-containing mold-forming material. Thus, it will be appreciated that the practice of the present invention provides a mold-forming composition which can be cured readily by carbon dioxide or other curing agent to form a rigid mold having an excellent unfired or "green" strength and yet which after firing and solidification of a casting therein, is characterized by high collapsibility so as to permit its ready removal from the casting surface.

If the mold or core is subjected to a short baking post cure the resultant tensile strength obtained from the combination of furan and silicate generally is better than that obtained with other collapsibility agents for silicate-containing composition.

The furan binders used in this invention are characterized as the liquid furan resins, the most preferred of which are the furfuryl alcohol modified urea-formaldehyde resins. Suitable flowable furan resins are those set forth in U.S. Patent 1,665,235; U.S. Patent 2,431,035; U.S. Patent 2,343,973; and U.S. Patent 2,601,497. Other furans, such as furfural, may be used in conjunction with or as a replacement for the furfuryl alcohol in the modified urea-formaldehyde resin, although the use of furfuryl alcohol alone is preferred.

As used herein, urea-formaldehyde resins encompass those resins containing other members of the urea class, such as dimethyl urea, as well as minor amounts of phenolic compounds, such as amyl phenol. In the most preferred furan resins the mol ratio of the urea component to the formaldehydde component ranges from about 1:1 to about 1:2.80 (e.g. from 1:1.85 to 1:2.80), and the furan modifier, e.g. furfuryl alcohol, constitutes from about 5 to about 80 percent by weight (e.g. from 20 to 80 percent by weight) of the resin binder.

If the resin forming components are blended into the mold or core forming compositions as separate unreacted ingredients, the resin formation can be effected in situ. Preferably, a liquid urea-formaldehyde reaction product is added along with the furfuryl alcohol or other furan modifier. The furfuryl alcohol can serve as solvent or other solvents can be used to obtain the desired consistency for optimum blending with the other ingredients of the mold or core forming composition. The preparation of curable furan modified urea-formaldehyde resins is well known, and further description is therefore not required.

Unmodified urea-formaldehyde resins have also been tried as illustrated in the examples. They, however, while aiding in the collapsibility of the fired core, do not achieve sufficient gassed strength and are low in baked strength. Unexpectedly, the furfuryl alcohol modified urea-formaldehyde produces high gassed strength and good baked strength. The furfuryl alcohol apparently contributes to the gassed strength by either partially curing under acidic gaseous conditions, or giving greater porosity to the sand mix allowing increased gas permeation, or both.

Silicates of the various alkali metals including potassium, sodium, cesium, rubidium, and lithium can be employed, while the sodium silicates constitute the preferred and most practicable silicates. For that reason special reference will be made herein to sodium silicates although it will be understood that the present invention is not limited thereto.

Generally the term "alkali metal silicate," preferably a sodium silicate, may include silicates having varying silica: alkali metal oxides as those having a silica to alkali metal oxides ratio greater than 1.0:1.0 and desirably in the range 1.6:1 to 2.38:1 generally being suitable, those silicates having a silica to alkali metal oxide ratio within the ratio of 1.6:1 to 2.0:1 being preferred at present. It will be further understood that both liquid and dry silicates may be employed using, where necessary, sufficient water to provide the desired silicate solution. However, the preferred solid silicate is one having a ratio of silica to alkali metal oxide of 2.0:1 and containing approximately 18% water. Liquid silicates in the range of approximately 35% to 56% solids may be used.

Any ordinary sand or other refractory material may be employed in the practice of the invention. Advantageously, the sand or its equivalent that is employed has a fineness in accordance with the values of the American Foundrymen's Society (AFS) that is in the numerical range between 25 and 180. Preferably to obtain the optimum benefits of this invention, a silica sand of AFS fineness number in the neighborhood of 50–75 should be used.

It is observed that the practice of this invention does not require the use of other organic additives, such as sugars, or pitches, as has heretofore been suggested for inclusion in a mold forming composition. However, in some cases, while not necessary, the use of sugars or other so called collapsibility agents is compatible with the practice of this invention and may be so employed.

With respect to the relative proportion of finely-divided refractory and silicate, it is preferable, of course, to employ a major proportion of the refractory material and a minor proportion of the silicate as a binder. In terms of the refractory material used it is typical to employ the silicate in an amount up to about 6% by weight, the quantity being preferred at present being 1% to 3% by weight.

With respect to the ratio of the furan binder to silicate binder, it can be varied from 4:1 to 1:4, ratios in the range 3:1 to 2:3 being preferred at present, the most preferred ratio range being 3:2 to 1:1.

In practice, the formation of a cured structure in accordance with the present invention comprises subjecting a mixture of the sand or other refractory containing the silicate and furan binders to the action of carbon dioxide, carbon dioxide containing gases or other reactive substances capable of converting the mixture into a rigid, high strength material. Mixtures of these or other gaseous materials such as sulfur dioxide, nitrogen dioxide, hydrogen chloride, as well as various stack gases or other combustion gases, containing substantial amounts of carbon dioxide or other reactive acidic gases capable of effecting the desired curing of the silicate-containing mold-forming composition may be used.

In those cases where a post cure is desired, the molds or cores may be baked in an oven at 250° F. to 500° F., preferably about 350° F., for periods of time depending on size of the specimens and the nature of the binders.

In practice, the refractory material is blended with the binders. Both binders can be added simultaneously or as separate additives. The blending can be done in any suitable manner, as by milling, or other mixing operation.

The prepared mixture is then placed in contact with a mold-defining surface such as a pattern. This can, if desired, be coated with a suitable release or separating agent. When the refractory material-binder mixture is in contact with the mold-defining surface, it is compressed by ramming, blowing, or other convenient methods. The compacted material is then impregnated or otherwise contacted with carbon dioxide or other suitable gaseous reactant for a short time to complete curing of the mold-forming composition. Typically, carbon dioxide can be injected into a sand-furan binder-sodium silicate binder mixture for a period of a few seconds up to one minute or more, depending on the size of the mold being prepared, the fineness of the sand, the proportions of the reactants and the like.

The specific examples, which follow in Table I are provided to illustrate the practice of the present invention and to demonstrate the improved collapsibility obtained by the practice of the invention but it is to be understood that it is not to be so limited to the examples, since changes and alterations therein may be made which are within the scope of the specifications. The designation FA refers to furfuryl alcohol in the tables.

The specific examples, which follow in Table II are provided to illustrate the practice of the present invention and demonstrate the excellent gassed shear strength and baked tensile strength obtained by the practice of the invention, but it is to be understood that they are illustrative and that the practice of the invention is not limited to these examples, since change and alterations therein may be any which are within the scope of the specifications.

Table I

| Ex. | Nature of Silicate (SiO$_2$:Na$_2$O) and Approx. Solids | Percent of Silicate in core composition | Nature of Furan resin (Urea: HCHO and percent FA) | Percent of Furan resin in core composition | Time to Collapse [1] (sec.) ||| Retained Strength [2] (p.s.i.) |||
|---|---|---|---|---|---|---|---|---|---|---|
| | | | | | 1,000° | 1,500° | 2,000° | 1,000° | 1,500° | 2,000° |
| 1 | 1.9:1, 43.5% solids | 2.5 | | | 400 | 278 | 118 | 260 | 150 | 500 |
| 2 | 1.9:1, 43.5% solids | 4.0 | | | 400 | 242 | 127 | 400 | 220 | 1,000 |
| 3 | 1.9:1, 43.5% solids | 1 | 1:2.05 (urea:HCHO), 24% (FA). | 1.5 | 159 | 120 | 38 | 68 | 31 | 29 |
| 4 | 90% 1.9:1, 43.5% solids; 10% Sucrose Syrup. | 1.0 | 1:2.05 (urea:HCHO), 24% (FA). | 1.5 | 117 | 98 | 36 | 20 | 22 | 23 |
| 5 | 75% 1.9:1, 43.5% solids; 25% Sucrose Syrup. | 1.0 | 1:2.05 (urea:HCHO), 24% (FA). | 1.5 | 147 | 7 | 27 | 60 | 8 | 22 |
| 6 | 2.0:1, 82.5% solids | .53+.47 H$_2$O | 1:2.05 (urea:HCHO), 24% (FA). | 1.5 | 37 | 44 | 21 | 43 | 39 | 84 |

[1] 1⅛" by 2" cylindrical specimens. Examples 1-16, gassed 15 seconds at 4 p.s.i. and 4 L/min. Examples 17-19 gassed 10 seconds at 4 p.s.i. and 4 L/min. Baked 10 min. at 350° F. Time in seconds to collapse, with 85 p.s.i. load.
[2] 1⅛" by 2" cylindrical specimens, gassed 15 seconds at 4 p.s.i. and 4 L/min. Baked 10 minutes at 350° F. Retained strength in p.s.i. after 12 minutes soak at the designated temperature.

Table II

| Example | Nature of Silicate (SiO$_2$:Na$_2$O) and Approx. Solids | Percent of Silicate in core composition | Nature of Furan resin (Urea: HCHO and percent FA) | Percent of Furan resin in core composition | Shear in p.s.i. after gassing [1] at 4 p.s.i. and 4 L/min. ||| Tensile in p.s.i. (baked at 350° F.)[2] ||||
|---|---|---|---|---|---|---|---|---|---|---|---|
| | | | | | 10 sec. | 20 sec. | 30 sec. | Ungas | 10 sec. | 20 sec. | 30 sec. |
| 1 | 1.9:1, 43.5% solids | 2.5 | | | 12.5 | 24.8 | 35.3 | 352 / 310 / 276 | 236 / 250 / 252 | 140 / 145 / 88 | 128 / 59 / 72 |
| 2 | 1.9:1, 43.5% solids | 4 | | | 9.1 | 16.6 | 24.4 | 352 / 353 / 288 | [3]NB / [3]NB / 359 / 144 | 359 / 329 / 314 / 167 | 322 / 286 / 286 / 142 |
| 3 | 1.9:1, 43.5% solids | 1 | 1:2.05 (urea: HCHO) 24% (FA). | 1.5 | 16.8 | 21.8 | 23.5 | 351 / 335 / 273 | 315 / 295 / 205 | 300 / 272 / 202 | 288 / 282 / 197 |
| 4 | 90% 1.9:1, 43.5% solids; 10% Sucrose Syrup. | 1.0 | 1:2.05 (urea: HCHO) 24% (FA). | 1.5 | 13.6 | 12.7 | 14.6 | 336 / 337 / 253 | 315 / 334 / 130 | 315 / 284 / 227 | 321 / 296 / 142 |
| 6 | 2.0:1, 82.5% | .53+.47 H$_2$O | 1:2.05 (urea: HCHO) 24% (FA). | 1.5 | 14.2 | 17.3 | 16.6 | 357 / 355 | 307 / 271 | 280 / 285 | 297 / 233 |

[1] 2" by 2" cylindrical specimens. Examples 1-19 gassed 10, 20, and 30 sec. as indicated in the table at 4 p.s.i. and 4 L/min.
[2] Tensile briquettes gassed as indicated in the table at 4 p.s.i. and 4 L/min. The first figure under each gassing time is average tensile strength in p.s.i. of 10 min. bake at 350° F., the second for a 20 min. bake, and the third for a 30 min. bake.
[3] NB—Did not break in tensile machine.

Table III

| Example | Formulation: (SiO$_2$:Na$_2$O) (percent solids) | Time to Collapse [1] | Retained Strength [2] | Shear [3] | Tensile in p.s.i. (Baked at 350° F.)[4] ||||
|---|---|---|---|---|---|---|---|---|
| | | | | | Ungas | 10 sec. | 20 sec. | 30 sec. |
| 7 | 0.9% Silicate (1.9:1) (43.5%), 0.1% Sucrose Syrup, 1.5% Furan (1 Urea: 2.05 HCHO, 24% Furfuryl Alcohol). | 117 / 98 / 36 | 20 / 22 / 23 / 77 | 13.6 / 12.7 / 14.6 | 273 / 366+ / 337 | 205 / 315 / 334 | 202 / 315 / 284 | 197 / 321 / 296 |
| 8 | 0.9% Silicate (1.9:1) (43.5%), 0.1% Sucrose Syrup, 1.5% urea formaldehyde resin. | 58 / 24 / 74 | 15 / 6 / 7 / 26 | 2.4 / 3.4 | 160 / 328 / 315 | 45 / 285 / 285 | 35 / 287 / 280 | 40 / 305 / 295 |
| 9 | 0.9% Silicate (1.9:1) (43.5%), 0.1% Sucrose Syrup, 1.5% Furfuryl Alcohol. | | | 9.2 / 11.3 / 9.6 | 51 / 38 / 38 | Insig / Insig / Insig | Insig / Insig / Insig | Insig / Insig / Insig |
| 10 | 0.9% Silicate (1.9:1) (43.5%), 0.1% Sucrose Syrup, 1.5% Urea formaldehyde resin (Admirez UL50). | ([5]) | | | | | | |

[1] 1⅛" by 2" cylindrical specimens gassed 15 seconds at 4 p.s.i. and 4 L/min. Baked 10 minutes at 350° F. Time in seconds to collapse with 85 p.s.i. load. First figure in column is for 1,000° F., the second for 1,500° F., and third for 2,000° F.
[2] 1⅛" by 2" cylindrical specimens gassed 15 seconds at 4 p.s.i. and 4 L/min. Baked 10 minutes at 350° F. Retained strength is in p.s.i. after 12 minutes soak at 1,000° F., 1,500° F., 2,000° F. and 2,500° F. respectively.
[3] 2" by 2" cylindrical specimens gassed 10, 20 and 30 seconds at 4 p.s.i. and 4 L/min. The sheer is reported in p.s.i. for the 10, 20 and 30 second gassing respectively.
[4] Tensile briquettes gassed as indicated in the table at 4 p.s.i. and 4 L/min. The first figure under each gassing time is the average tensile strength in p.s.i. at a 10 minute bake at 350° F., the second for a 20 minute bake, and the third for a 30 minute bake.
[5] Could not gas.

Although it is known that urea formaldehyde resins can be used with silicate binders in the practice of the carbon dioxide process, these products do not give all of the advantages of good shear, good tensile, and good collapsibility which may be realized by the practice of the present invention (Table III, Examples 8 and 10). Furfuryl alcohol when used with the silicate gives good shear and collapsibility but inadequate tensile strength (Table III, Example 9). The use of furan binders as exemplified in this invention provides the foundry operator with a method of utilizing the good points of the carbon dioxide process without the limitations of previously mentioned additives. The examples shown in Table III are illustrative of results obtained with urea-formaldehyde resins, furfuryl alcohol, or silicates alone, with comparison to the furan binders of this invention (Table III, Example 7).

As the data indicates, by the practice of this invention there is obtained not only excellent shear strength, but also, singularly short collapsibility time, low retained strength, and good baked tensile strength in those applications where a post cure is desirable.

While the present invention is of general utility in the metal casting art, the practice of this invention also is particularly useful in those applications where, because of limited number of castings to be produced, the use of driers is uneconomical and in the cases where slumping and consequent loss of dimensional tolerance occurs in tall cores even with the use of driers. It is recognized that perhaps part of these objectives could be obtained by other systems, but the uniqueness of the present invention lies in the excellent shear, short collapsibility time, low retained strength at pouring temperature, excellent dimensional tolerance, excellent surface finish, and good tensile strength obtained by the practice of this invention.

It is to be understood that although the invention has been described with specific reference to particular embodiments thereof, it is not to be so limited, since changes and alterations therein may be made which are within the fully intended scope of this invention as defined by the appended claims.

What is claimed:

1. The method of forming a metal casting mold which comprises placing in contact with a casting defining surface an intimate mixture of a major proportion of a finely divided refractory material, from about 1% to about 6% by weight of said refractory of an alkali metal silicate, a furan-modified urea-formaldehyde resin wherein the furan modifier constitutes from 5 to 80 percent by weight of said resin and wherein the weight ratio of said resin to said silicate is from 4:1 to 1:4, and impregnating the mixture with an acidic gaseous reactant capable of curing the mixture.

2. The method of claim 1 wherein the mold form is post cured by baking for a short period in an oven at 250° F. to 500° F.

3. The method according to claim 2 wherein the silicate is sodium silicate.

4. The method according to claim 2 wherein the resin is a urea-formaldehyde-furfuryl alcohol resin.

5. A composition of matter which consists essentially of a major proportion of a finely-divided refractory material, of about 1% to about 6% by weight of said material of an alkali-metal silicate, and a furan-modified urea-formaldehyde resin wherein the furan modifier constitutes from 5 to 80 percent by weight of said resin and wherein the weight ratio of said resin to said silicate is from 4:1 to 1:4.

6. A composition according to claim 5 wherein the alkali-metal silicate is sodium silicate.

7. A composition according to claim 5 wherein the resin is a urea-formaldehyde-furfuryl alcohol resin and wherein the weight ratio of resin to silicate is from 3:1 to 2:3.

8. A composition according to claim 5 in which a liquid sodium silicate is utilized having a $SiO_2:Na_2O$ ratio of 1.6:1 to 2.38:1 and a solids content of 35 to 56%.

9. A composition according to claim 5 in which a solid silicate of a $SiO_2:Na_2O$ ratio of 2:1 plus additional water is utilized.

10. A composition according to claim 5 wherein the resin has a urea:formaldehyde mole ratio within the range of 1:1.85 and 1:2.80 and a furfuryl alcohol content within the range of 20–80% by weight.

11. A composition according to claim 5 in which alkali metal silicate is present in an amount of from about 1 to 3 percent by weight of said refractory material and wherein the weight ratio of resin to silicate is from 3:2 to 1:1.

12. A binder composition consisting of a mixture of alkali metal silicate and from 25% to about 400% of a resin based on the weight of the silicate said resin being a furan-modified urea-formaldehyde resin wherein the furan modifier constitutes from 5 to 80 percent by weight of said resin.

13. A metal casting mold comprising a casting-defining structure formed of an intimate cohesive mixture of a composition according to claim 5.

References Cited by the Examiner

UNITED STATES PATENTS

| | | | |
|---|---|---|---|
| 3,008,205 | 11/61 | Blaies | 22—193 |
| 3,059,297 | 10/62 | Dunn et al. | 22—193 |
| 3,108,340 | 10/63 | Peters et al. | 22—193 |

FOREIGN PATENTS

| | | |
|---|---|---|
| 710,099 | 6/54 | Great Britain. |
| 202,286 | 2/59 | Austria. |
| 1,208,317 | 9/59 | France. |

MARCUS U. LYONS, *Primary Examiner.*